Oct. 23, 1956 W. E. SAXE 2,767,853
ROTARY FILTER MEANS
Filed Dec. 10, 1951 3 Sheets-Sheet 1
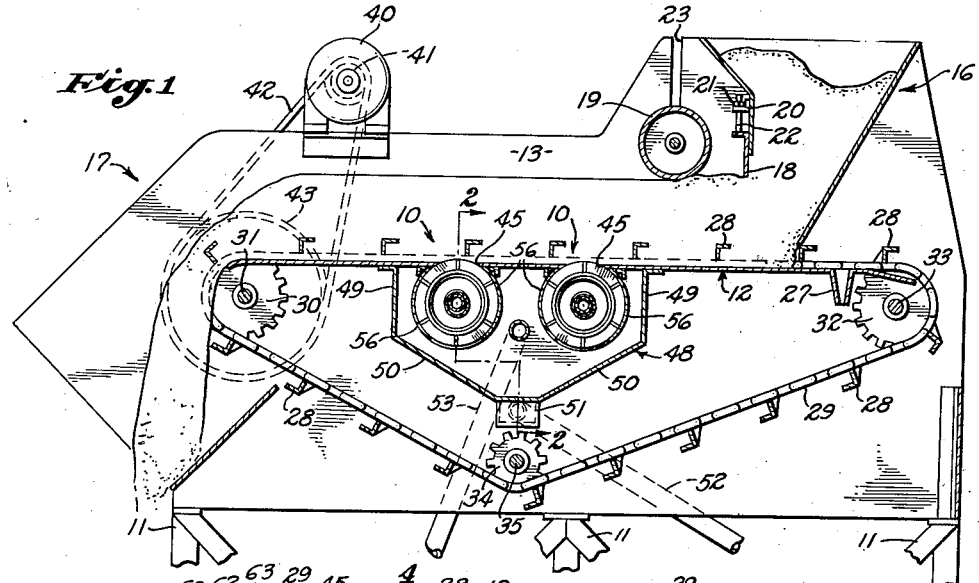
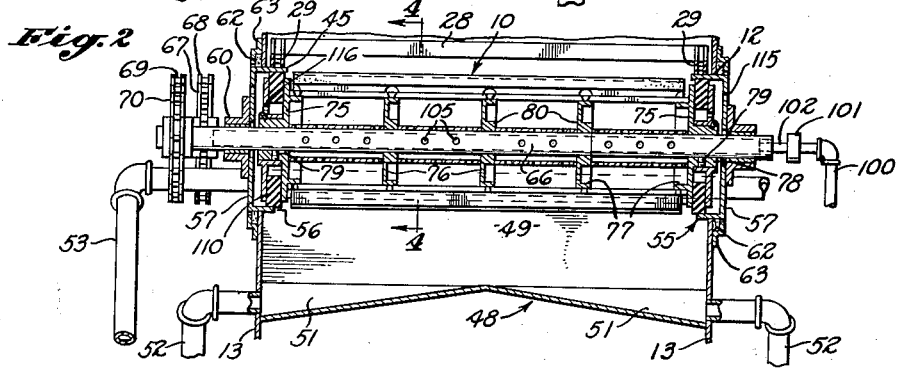
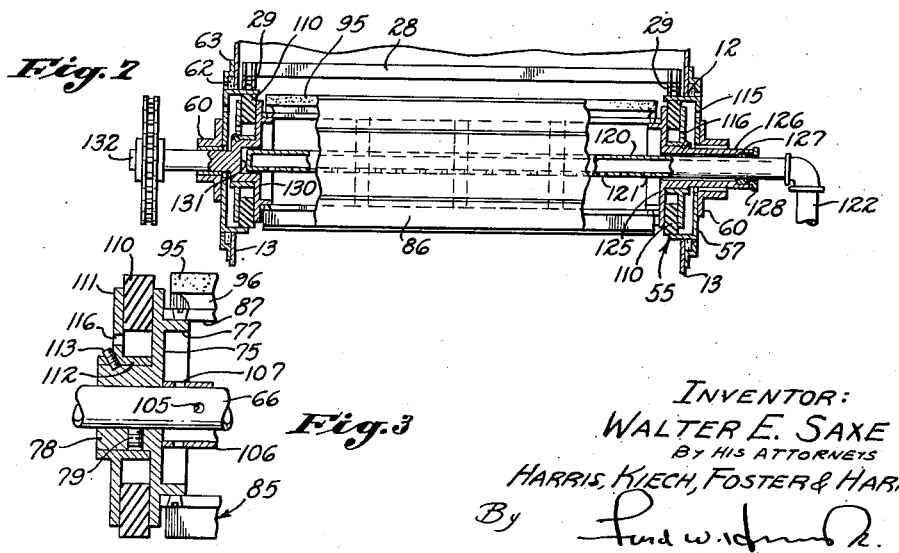
INVENTOR:
WALTER E. SAXE
BY HIS ATTORNEYS
HARRIS, KIECH, FOSTER & HARRIS Oct. 23, 1956  W. E. SAXE  2,767,853
ROTARY FILTER MEANS
Filed Dec. 10, 1951  3 Sheets-Sheet 2
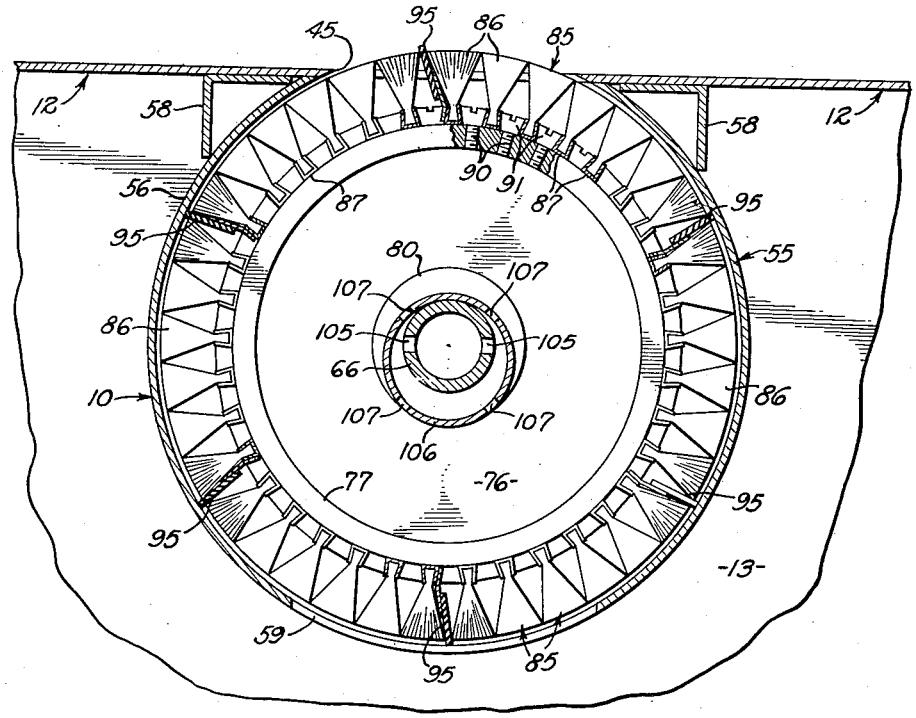
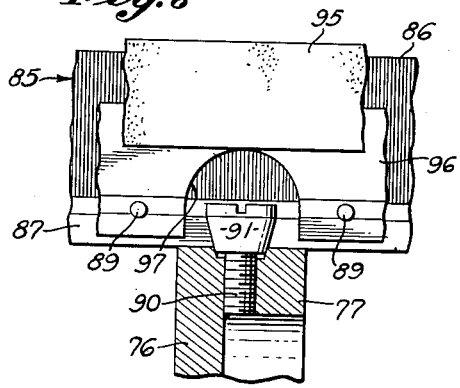
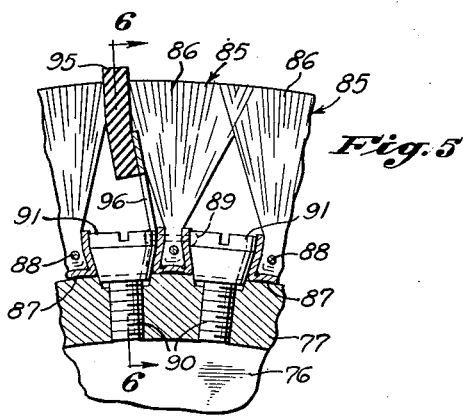
INVENTOR:
WALTER E. SAXE
BY HIS ATTORNEYS
HARRIS, KIECH, FOSTER & HARRIS Oct. 23, 1956 W. E. SAXE 2,767,853
ROTARY FILTER MEANS
Filed Dec. 10, 1951 3 Sheets-Sheet 3
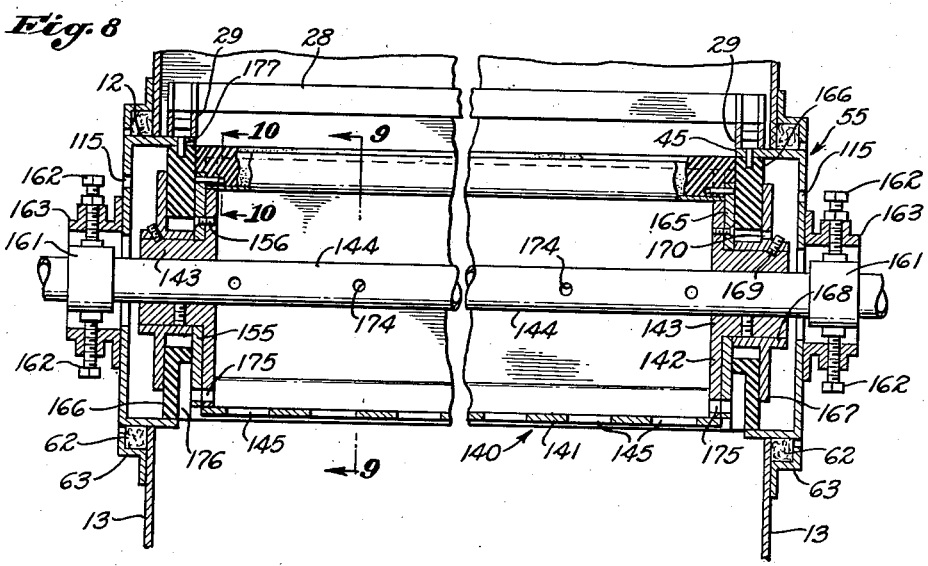
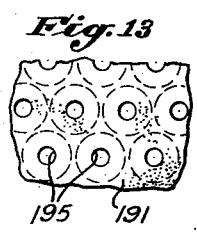
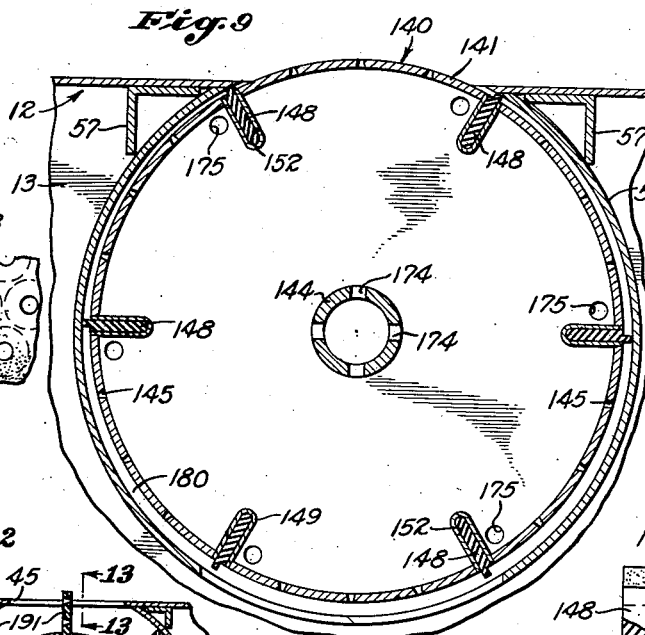
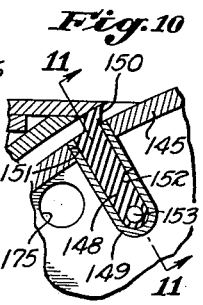
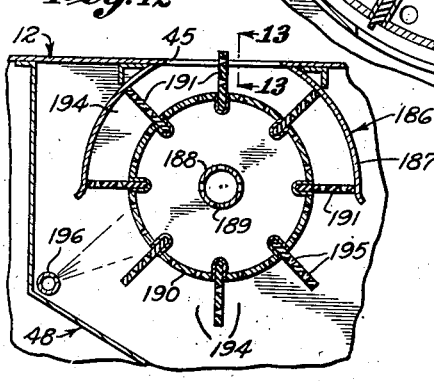
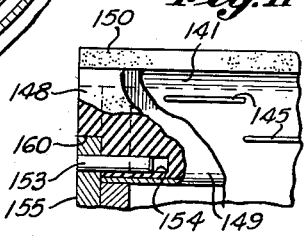
INVENTOR:
WALTER E. SAXE
BY HIS ATTORNEYS
HARRIS, KIECH, FOSTER & HARRIS

United States Patent Office 2,767,853
Patented Oct. 23, 1956

2,767,853
ROTARY FILTER MEANS

Walter E. Saxe, Pasadena, Calif., assignor to The Conveyor Company, Inc., Los Angeles, Calif., a corporation of California Application December 10, 1951, Serial No. 260,843

21 Claims. (Cl. 210—199)

This invention relates to filter means for use with pulp where the object of the filter means is to hold back the pulp while freely passing a fluid of either liquid or gaseous character. Thus, the pulp may be the product under process or the pulp may be a medium for processing a fluid drawn through the pulp. For the purpose of specific illustration, the invention will be described as embodied in a filter means for use in dehydrating sand, since such a disclosure will afford adequate guidance for those skilled in the art who may have occasion to apply the underlying principles to other specific purposes.

The presently preferred practice of my invention is characterized by the use of a rotary brush as a filter means, but as will be explained, other practices of the invention may use other specific forms of rotary filters. The use of a rotary brush as a filter means in a process for dehydrating pulp is exemplified by my Patent No. 2,237,635, granted April 8, 1941, covering a Pulp Dehydrator and also by my co-pending application Serial No. 246,477 entitled Centrifugal Dehydrator filed September 13, 1951, now Patent No. 2,718,309, dated September 20, 1955. Both of these prior disclosures are hereby incorporated in the present disclosure by reference.

A suitably constructed rotary brush is an excellent filtering means because the diverging peripheral bristles readily block radially inward movement of pulp particles while freely passing liquid or gaseous fluids. The outstanding advantage, however, is that a rotating brush has an exceptionally long service life at sustained high filtering efficiency and therefore makes possible economically long production runs without shut-downs for servicing or renewing filter elements. In effect, the peripheral mass of bristles which does the actual filtering is self-renewing or self-cleaning in that the bristles continually move out of the fitlering zone into a second zone away from the pulp where gravity, centrifugal force and other factors are conducive to the removal of residual pulp particles from the bristles.

One object of the preferred practice of the invention is to improve and augment this continuous automatic renewal or cleaning of the brush; a second object is to increase the permeability or perviousness of the rotary brush structure with respect to liquid or gaseous fluids; and a third object is to extend the uninterrupted service life of the brush both by reducing wear on the bristles and by reducing wear on the bearings on the rotary structure.

Broadly described, the first object of the invention is accomplished by introducing into the interior of the rotating brush suitable means to direct a fluid stream, either liquid or gaseous, radially outward to clean the bristles as the bristles pass through a cleaning zone away from the body of pulp. The second object of increasing the perviousness of the brush is achieved by providing what may be termed an open brush structure in which both the inner core structure of the brush and the peripheral or circumferential structure afford numerous paths for fluid flow into and through the brush structure.

The rotary brush is mounted in position to contact the sand under process and adjacent arcuate walls are necessary to prevent escape of the sand past the periphery of the brush.

It has been found that excessive wear on the brush bristles arises not so much from simple contact with the pulp or sand particles as from movement of the brush bristles in contact with the arcuate walls since sand particles caught between the bristles and the arcuate walls function as active abrasive elements. The concept of the present invention is to provide sufficiently liberal clearance between the bristles and adjacent walls as to preclude such abrasive action on the part of intervening sand particles and to seal this clearance space against circumferential fluid flow by providing circumferentially spaced, longitudinal blades of suitable material, such as rubber, for moving contact with the adjacent solid surfaces.

Longer life on the part of the rotary brush bearings to make possible longer runs of uninterrupted production is accomplished by interposing floating sealing means between the brush bearings and the periphery of the brush and by further providing for continuous fluid flow, either liquid or gaseous, in a direction away from the bearings past the sealing means. This fluid flow counters any tendency of pulp particles to move in the opposite direction past the sealing means to the brush bearings.

In a further practice of the invention no brush means is employed but, as in the first form of the invention, an open or pervious core structure is used and longitudinal blades are mounted on the periphery of the core to cooperate with the adjacent arcuate walls. In the absence of bristles, the pulp is free to enter peripheral pockets formed by the spaced blades but the quantity is relatively small and is readily recycled. The blades are perforated so that fluid from the pump is free not only to pass through the open core structure but also to pass around the core structure through the blades.

In the drawings, which are to be regarded as merely illustrative:

Fig. 1 is a longitudinal vertical section of a dehydrating apparatus incorporating a preferred form of my invention;

Fig. 2 is a transverse section taken as indicated by the broken line 2—2 of Fig. 1;

Fig. 3 is an enlargement of a portion of Fig. 2 at the end of the brush structure;

Fig. 4 is a greatly enlarged, transverse sectional view of the brush taken as indicated by the line 4—4 of Fig. 2;

Fig. 5 is a fragmentary portion of the brush of Fig. 4 shown on a larger scale;

Fig. 6 is a fragmentary longitudinal section of the brush periphery taken as indicated by the line 6—6 of Fig. 5;

Fig. 7 is a view similar to Fig. 2 showing a modified form of the rotary brush partly in side elevation and partly in axial section;

Fig. 8 is a view similar to Fig. 7 showing a third form of rotary filter means without bristles;

Fig. 9 is an enlarged transverse section taken as indicated by the line 9—9 of Fig. 8;

Fig. 10 is a greatly enlarged fragmentary section taken as indicated by the line 10—10 of Fig. 8;

Fig. 11 is a section taken as indicated by the line 11—11 of Fig. 10;

Fig. 12 is a sectional view similar to Fig. 9 showing another form of rotary filter means without bristles; and Fig. 13 is a greatly enlarged detail taken as indicated by the line 13—13 of Fig. 12.

Fig. 1 shows two rotary brushes generally designated by the numeral 10 constructed in accordance with the present invention and incorporated in a pulp dehydrating apparatus of the character disclosed in the previously mentioned Patent No. 2,237,635.

The apparatus which is designed primarily for dewatering or dehydrating sand is mounted on suitable frame members 11 and has what may be termed a platform or horizontal support wall 12 that interconnects and is supported by two spaced side walls 13. At one end of the apparatus a receiving hopper 16 feeds the incoming sand to the platform 12 for movement along the platform by suitable conveying means to a discharge chute 17 at the opposite end of the machine.

It is contemplated that the incoming sand will be formed into a blanket-like body of uniform depth and for this purpose the apparatus may include a vertically adjustable gate 18 and a cooperating compacting idler roller 19. The gate 18, in effect, constitutes a part of the wall of the receiving hopper 16 and is supported from a bracket 20 by a nut 21 which may be rotated on a threaded member 22 to raise and lower the gate. The compacting roller 19, which presses downwardly on the surface of the sand moving away from the gate 18, is suitably mounted in vertical slots 23 in the side walls 13 for vertical adjustment. The platform 12 may be provided with a suitable drain spout 27 just outside the receiving hopper 16 for the ready drainage of any free water released by initial deposit of the sand on the platform.

The arrangement shown in the drawings for continuously moving the body of sand across the platform 12 comprises a series of transverse conveyor angles 28 carried by a pair of conveyor chains 29. The conveyor chains 29 pass around a set of sprockets 30 on a driven shaft 31 at one end of the apparatus, and again pass around a second set of sprockets 32 on a shaft 33 at the opposite end of the apparatus and pass under a third intermediate set of sprockets 34 on a shaft 35 at a lower level. The driven shaft 31 is actuated by a suitable motor 40 through the medium of a motor sprocket 41, chain belt 42 and a relatively large sprocket 43 on the shaft 31.

The platform 12, which preferably is a metal plate, is provided with two transversely extending openings 45 each of which is spanned by the upper peripheral portion of a rotary brush 10 so that each brush supports the moving body of sand as the sand crosses the corresponding platform opening. The brush, of course, rotates in the direction of movement of the pulp bed and preferably the peripheral speed of the brush approximates the linear speed of the pulp conveyor.

Where it is desired to remove only a moderate amount of water carried by the sand, for example in a preliminary dewatering process, simple gravity flow of water from the traveling sand through the rotating brushes may be relied upon. In the particular practice of the invention here under consideration, however, it is contemplated that a pressure differential will be created downward through each of the openings 45 across the corresponding rotating brush to facilitate the separation of water from the moving sand. The particular means chosen to accomplish this end comprises a suitable vacuum chamber 48 enclosing the two brushes 10.

The vacuum chamber 48 is formed in part by the platform 12, in part by the side walls 13 of the apparatus and in part by two end walls 49 together with two downwardly inclined bottom walls 50 that converge on a drainage trap 51. A pair of suitable drainage pipes 52 carry water away from the drainage trap 51, each pipe being provided with a water seal at its outer end (not shown) in a well known manner to prevent reverse flow of air therethrough. A vacuum is maintained in the vacuum chamber 48 by an air-evacuation pipe 53 that leads to a suitable pump (not shown) and continually withdraws air that enters the vacuum chamber through the brushes 10.

The structure described to this point is old in the art. The description will now be directed to the features of novelty of the present invention.

One feature is the concept of providing a housing, generally designated 55 that largely encases each of the rotary brushes. Each housing 55 has a cylindrical wall 56 closed at each end by an end wall 57 and is braced by a pair of spaced angles 58 on the underside of the platform 12. The cylindrical wall 56 is cut away to provide an upper opening conforming with a corresponding transverse opening 45 in the platform 12 and is further cut away to provide a lower opening 59. Thus the housing 55 forms a down-flow passage enclosing the rotary brush, as best shown in Fig. 4, the transverse opening 45 in the platform 12 being the inlet to the passage and the lower transverse opening 59 being the passage outlet. Since the cylindrical wall 56 conforms to the periphery of the enclosed rotary brush, fluid drawn downward from the upper opening 45 is necessarily directed into and through the structure of the rotary brush.

As shown in Fig. 2, each housing 55 carries a pair of bearings 60 for the rotary brush and is mounted in circular openings in the side walls 13 of the apparatus. Suitable sealing means may be provided around the outer ends of the housing in the form of sealing gaskets 62 of rubber or the like which are confined by removable metal rings 63.

Each of the rotary brushes 10 has a shaft 66 journalled in the two bearings 60 and is suitably driven to make the peripheral speed of the brush substantially equal to the rate of travel of the conveyor angles 28 that move the body of sand along the platform 12. In the arrangement shown, a sprocket 67 on the shaft 66 of one of the two rotary brushes 10 is driven by a sprocket chain 68 and the other rotary brush is operatively connected to the first brush by a sprocket chain 69 engaging two sprockets 70 on the two brush shafts 66 respectively.

Each of the rotary brushes 10 has what may be termed an open core construction to permit the free flow of fluid therethrough, which core construction comprises a shaft 66 and a plurality of longitudinally spaced radial means to support a peripheral brush structure. In the particular construction shown in Fig. 2 the radial support means comprise a disc 75 at each end of the brush and a series of intermediate discs 76, each of these various discs having an outer circumferential flange 77 adapted for support of the peripheral brush structure. The two end discs 75 are formed with relatively heavy hubs 78 that are secured to the shaft 66 by suitable set screws 79 and the intermediate discs 76 have similar but smaller hubs 80 fixedly mounted on the shaft.

The peripheral brush structure is also of open construction in the sense of providing numerous well distributed passages for fluid flow into and out of the open core construction of the brush. In the preferred practice of the invention the peripheral structure comprises a plurality of longitudinal brush members generally designated 85 and best shown in Figs. 4, 5 and 6, these brush members being removably mounted on the open core structure for convenient replacement when necessary.

Each of the longitudinal brush members 85 comprises a mass of bristles 86 diverging outward from a suitable longitudinal base 87. As best shown in Fig. 5 the individual bristles are looped around a concealed longitudinal wire 88 and the base 87 comprises a strip of metal that is bent to U-shaped cross-sectional configuration to engage and encase the portions of the bristles looped around the wire 88. The enclosed wire 88 forms an enlargement and the two sides of the base 87 being pinched inward and interconnected by rivets 89 engage this enlargement and thus anchor the bristles in a positive manner. It will be noted that the resulting cross-sectional configuration of the base 87 is tapered with the larger cross-sectional dimension at the bottom of the base.

One advantage of the described construction for the longitudinal brush members 85 is that it permits the brush members to be securely but removably mounted on the open core structure by suitable screws 90 having heads 91 tapered to conform to the tapered configuration of the brush bases 87. The screws 90 are threaded into the circumferential flanges 77 of the various brush supporting discs 75 and 76. As may be seen in Fig. 5, the heads 91 of two screws 90 on each of the circumferential flanges 77 cooperate to engage a brush base 87 from opposite sides, the brush base being in effect wedged between the screw heads 91. It will be noted that the screw heads 91 not only serve to releasably hold the brush bases 87 in place but also serve as spacers to hold the brush bases apart thereby forming numerous longitudinal peripheral passages between the brush bases for fluid flow into and out of the open core structure of the brush. The peripheral spacing of the brush bases 87 is small enough, however, to cause the flaring bristles of the series of brush members 85 to merge together to form a substantially continuous peripheral mass of bristles. In a typical construction of the invention the diameter of the brush supporting discs 75 and 76 may be 12 inches and from 37 to 42 brush members 85 may be mounted thereon.

It is apparent from an inspection of Fig. 4 that when a fluid such as air is drawn downwardly through the brush-enclosing housing 55, the fluid is free to flow in peripheral paths around and through the bristles of the brush members 85 and is free to flow into and through the open core structure of the brush. To limit such peripheral flow and to encourage maximum flow directly through the interior of the brush structure, a series of circumferentially spaced, longitudinal blades 95 of rubber or suitable material may be mounted among the peripheral bristles of the rotary brush to move in wiping contact with the cylindrical housing wall 56.

As best shown in Figs. 5 and 6, the blades 95 may be strips of rubber vulcanized to supporting strips of metal 96. The support strips 96 may be cut away as shown at 97 in Fig. 6 to clear the various screw heads 91 and may be attached to the bases 87 of brush members 85 by the previously mentioned rivets 89. At least one, and preferably two, of the blades 95 should be in contact with the wall 56 on each side of the housing 55 at all times and therefore each of the rotary brushes should have at least six of the equally spaced blades 95 as indicated in Fig. 4.

Preferably the peripheral mass of bristles 86 of the rotary brush falls short of contact with the housing wall 56 by a sufficient distance to practically eliminate the previously mentioned abrasive effect of sand particles caught between the rotating brush and the housing wall a distance of about three times the average particle size of the pulp is sufficient. In processing sand, for example, a clearance on the order of ⅛" between the bristle ends and the housing wall 56 will accomplish this purpose by causing the sand between the rotating brush and the arcuate walls to form relatively thin layers between the blades 95, which layers tend simply to travel with the periphery of the rotating brush without excessive wear on the brush bristles. If the clearance were on the order of the thickness of the average sand particle, individual particles would tend to cut into the arcuate walls.

The previously mentioned feature of introducing a fluid into the interior of the rotating brush for outward flow to dislodge particles from the bristles may be provided in any suitable manner and the fluid employed may be either liquid or gaseous. In the presently described practice of the invention it is contemplated that water will be used and that the brush shaft 66 will be hollow to permit the water to be introduced at one external end of the shaft. In the construction shown in Fig. 2 a water supply pipe 100 is connected by a rotary joint 101 with a nipple 102 that is threaded into the end of the hollow shaft 66.

It is usually desirable that the water be discharged primarily downwardly not only because the downward direction is away from the travelling bed of sand on the platform 12 but also because both gravity and the downward flow of air into the vacuum chamber tend to dislodge sand particles from the downwardly directed bristles of the rotating brush and the downward discharge of water from the interior of the brush will cooperate with these other factors effectively for dislodgement of particles from the bristles.

Downward discharge of the water from the interior of the brush is accomplished by providing a series of peripheral bores 105 in the rotating shaft 66 and loosely mounting on the shaft a series of over-sized cylinders 106 having perforations 107 that are staggered with respect to the shaft bores 105. As shown in Figs. 2 and 4 the loose cylinders 106 occupy the longitudinal spaces defined by the hubs of the brush supporting discs 75 and 76 and the cylinders hang eccentrically within the circumference of the hubs as may be seen by comparing the hanging cylinder 106 with the hub 80 of the disc 76 in Fig. 4. By virtue of this arrangement the various hubs form end walls for the various hanging cylinders 106 to confine the water released into the cylinders from the rotating shaft 66 and to cause the confined water to be discharged downward through the perforations 107 of the hanging cylinders. Any substantial upward discharge of water from the hanging cylinders is prevented by the closure of the shaft bores 105 by the surrounding hanging cylinders 106 as the shaft bores move into upwardly directed positions.

The preferred arrangement for protecting each of the bearings 60 of the rotary brushes 10 from the pulp includes a relatively thick sealing ring 110 which is preferably made of rubber and is peripherally confined by the cylindrical housing wall 56. As best shown in Fig. 3 the sealing ring 110 may be suitably retained between the radial wall of the disc 75 at the end of the rotary brush and a second similar radial wall 111 carried by a collar 112. The collar 112 embraces the heavy hub 78 of the end disc 75 and is releasably retained thereon by means such as a set screw 113.

It will be noted that the inside diameter of the sealing ring 110 is substantially larger than the outside diameter of the collar 112 which it surrounds so that the sealing ring is floatingly mounted in the sense of being free to take positions eccentric to the axis of the rotary brush shaft 66. Thus, slight off-center positioning of the brush shaft relative to the cylindrical wall 56 confining the sealing ring 110 will not prevent effective sealing cooperation between the sealing ring and the surrounding cylindrical wall 56.

Preferably, as heretofore suggested, means is provided to set up fluid flow past or around the sealing ring 110 to reverse any tendency for the particles of pulp to move past the sealing ring into the region of the rotary brush bearing 60. To this end it is contemplated that fluid will be introduced at each end of each rotary brush 10 for flow inwardly past the sealing ring 110. In the particular arrangement shown in Figs. 2 and 3, each of the outer end walls 57 of the housing 55 at the opposite ends of each rotary brush has a suitable inlet port 115 and the radial wall 111 at the outer face of the sealing ring 110 has a second fluid inlet port 116 that communicates with the annular space inside the sealing ring around the collar 112.

A suitable fluid, either gaseous or liquid, is caused to flow inward through these two parts 115 and 116 past the sealing ring 110 to the peripheral region of the rotary brush and whatever expedients are necessary to cause such fluid flow will be provided. In the present embodiment of the invention, the partial vacuum prevailing in the vacuum chamber 48 sets up a pressure differential to cause air to flow through the two ports 115 and 116. It will be noted that the air may take two paths, one path of flow around the periphery of the sealing ring 110 and the other path from the annular space inside the sealing ring radially outward between the inner face of the sealing ring and the adjacent radial wall of the end disc 75.

The described sealing rings 110 with the associated arrangements for fluid flow relative thereto not only protects the bearings of the rotary brushes but also has the equally important purpose of keeping the vacuum in the vacuum chamber 48 from sucking the sand down past the ends of the rotary brushes. Keeping the central space inside each sealing ring 110 at atmospheric pressure reduces the tendency of sand to be sucked in between the sealing rings and the adjacent metal walls. Otherwise the ends of the rotary brushes 10 would wear so rapidly as to require frequent replacement.

The operation of the invention will be readily understood from the foregoing description. As the wet sand from the receiving hopper 16 travels across the platform 12 to the discharge chute 17 the partial vacuum in the vacuum chamber 48 causes air to flow downward through the travelling sand bed into the transverse openings 45 in the platform. The peripheral mass of bristles 86 of the rotary brushes permit the free passage of air and water but the inward convergence of the bristles blocks the sand particles and prevents any substantial sand penetration into the interior of the rotating brush. A thin layer of sand, however, continually moves from the bed of sand along the inner surface of the housing wall 56 of each rotary brush.

The previously described open construction of each rotary brush permits free flow of air and water therethrough at relatively high velocity and the sealing action of the various blades 95 against the housing wall 56 effectively prevents peripheral fluid flow around each brush and causes fluid flow to be concentrated in the interior regions of the rotating brush. Air drawn into each end of each rotary brush in the manner heretofore described continually counters any tendency for sand particles to move past the sealing rings 110 into the region of the brush bearings 60.

As the peripheral bristles of each rotary brush 10 move away from their upwardly pointing positions supporting the traveling sand bed to downwardly directed positions away from the sand bed, gravity force tends to dislodge any sand particles entrapped among the divergent bristles and this cleaning action is greatly augmented by the washing action of water released inside the open core structure of the brush. As heretofore described, the water from the supply pipe 100 enters the shaft 66 of each brush to flow outward through the shaft bores 105 and the oversized cylinders 106 with their perforations 107 direct the released water downward toward the downwardly directed bristles of the rotating brush. It has been found that this downward washing action by water introduced into the interior of the rotating brush is effective to clean the brush bristles without the assistance of air flow through the brush. For this reason the vacuum chamber may be omitted when the function of the apparatus is merely preliminary dewatering of the sand.

The modification of the invention illustrated by Fig. 7 is largely similar to the construction already described as indicated by the use of corresponding numerals to indicate corresponding parts. The primary distinction is the use of a stationary spray pipe 120 having downwardly directed jet ports 121. The spray pipe 120 is fixedly connected to a suitable supply pipe 122 and extends along the axis of the rotary brush, the end of the spray pipe being closed as shown. One of the previously mentioned end discs 75 of the rotary brush is replaced by an end disc 125 that is of the same general construction but has an extensive hub in the form of a sleeve 126 that rotatably surrounds the spray pipe 120. A suitable seal between the sleeve 126 and the spray pipe 120 may take the form of a sealing ring or gasket 127 retained by a packing gland 128. The sleeve 126 of the end disc 125 is journalled in one of the bearings 60 to support one end of the rotary brush.

At the other end of the rotary brush a special end disc 130 has a central pocket 131 to receive the blind end of the spray pipe 120 and is formed integral with a stub shaft 132 that extends through the second bearing 60 for actuating the rotary brush.

In the practice of the invention exemplified by Figs. 8 to 11, the previously described rotary brush is replaced by a rotary filter means, generally designated 140, that functions in the same general manner. The rotary filter means 140 comprises a closed cylinder having a cylindrical wall 141 and two end walls 142, each of which end walls has a central hub 143 by means of which the core structure is mounted on a suitable shaft 144.

The open character of the core structure is provided by suitable perforations in the cylindrical wall 141, preferably perforations in the form of numerous relatively short longitudinal slots 145. In the present construction which is designed for removing water from ordinary sand, the slots 145 may be .01 inch wide at the periphery of the cylindrical wall 141 and preferably, as best shown in Fig. 10, are of substantially greater width on the inside of the cylindrical wall. Thus, each slot 145 has a relatively narrow entrance on the periphery of the rotary core structure to discourage the entrance of sand particles and the divergent configuration of the slot tends to cause any sand particles that enter the slots to fall freely therefrom into the interior of the core structure instead of packing and blocking the slots.

Suitably mounted on the open core structure is a plurality of longitudinal blades 148 of rubber or like material that extend radially from the cylindrical wall 141 for sealing contact with the previously described arcuate walls 56 in the manner heretofore described. Each of the blades 148 is encased, in major part, in a frame comprising a metal strip 149 of U-shaped cross-sectional configuration. Preferably, the portion of the blade extending outside the frame 149 is reduced in thickness to provide a flexible edge portion 150 for wiping contact with the arcuate wall 56. It will be understood, of course, that the blades 148 may be fabricated and mounted in various ways in various practices of the invention.

In the preferred fabrication procedure, the cylindrical wall 141 is first welded to the end walls 142 and then the assembly is cut away to provide seats to receive the blades 148. For this purpose, longitudinal slots 151 (Fig. 10) are cut the full length of the cylindrical wall 141 and corresponding radial slots 152 are cut in the end walls 142, the radial slots conforming to the cross-sectional configuration of the blade frames 149. The blades 148 are backed into these longitudinal seats and are secured in place by suitable pins 153 that extend into longitudinal bores 154 at the opposite end of each blade as best shown in Fig. 11. The pins 153 are carried by circular keeper plates 155 that are secured to the opposite ends of the core structure by suitable screws 156. Since the keeper plates 155 add to the over-all length of the core structure and it is desirable to have the blades 148 of the same over-all length, the blades are dimensioned accordingly and, as shown in Fig. 11, are cut away to form recesses 160 at each end dimensioned to fit over the edges of the keeper plates.

As in the constructions heretofore described, the cylindrical wall 56 is part of a housing, generally designated 55, in which the shaft 144 of the rotary filter means is journalled. As shown in Fig. 8, a pair of bearings 161 for the shaft 144 may be held adjustably by set screws 162 that extend inwardly from suitable collars 163 mounted on the two ends of the housing 55. Each of the bearings 161 is protected from the abrasive action of the pulp by a suitable sealing ring 166 that corresponds to the previously described sealing rings 110. Each sealing ring 166 is confined between the corresponding keeper plate 155 at the end of the rotary filter means 140 and a radial wall or flange 167 provided by a collar 168 that is suitably retained by a set screw 169 on the hub 143. As heretofore described, the radial flange 167 may be provided with a port 170 so that air admitted through the inlet port 115 at the end of the housing 54 may flow around the sealing ring 166 into the interior of the apparatus to oppose any tendency for the pulp to enter the region of the sealing surfaces provided by the ring.

Preferably the shaft 144 is of hollow construction and is connected to a fluid source such as a water supply pipe for the purpose of continually washing pulp out of the interior of the rotary filter means. For this purpose, the rotary shaft 144 has suitable jet openings 174 which spray water into the interior of the core structure to remove the small quantity of pulp that enters through the narrow longitudinal slots 145. To permit adequate outflow of water and pulp, the two end walls 142 of the rotary filter means and the contiguous keeper plates 155 are provided with suitable drainage ports 175, there being one drainage port near each end of each blade 148. As the filter means rotates, the drainage ports 175 at each end of the rotating structure move successively into registry with a drainage space 176 that is provided by suitably cutting away a portion of each sealing ring 166. Each of the sealing rings 166 is suitably anchored against rotation, for example, by means of a pin 177 (Fig. 8) to keep the cutaway portion of the ring from moving out of position. It is apparent that pulp-bearing water flushed into the drainage spaces 176 will freely drain therefrom through the lower opening 59 of the housing.

The extent to which the edge portions 150 of the blades 148 extend radially beyond the cylindrical wall 51 of the core structure will vary in various practices of the invention. In the practice of the invention represented by Figs. 8 to 11, the intention is to minimize the proportion of pulp diverted by the rotary filter means and therefore the clearance between the cylindrical wall 141 of the rotary filter means and the adjacent cylindrical wall 56 of the housing 55 is relatively small. In this instance, the minimum clearance is approximately three times the expected particle size of the sand. As heretofore explained, a clearance of such relative magnitude will cause the sand to form thin layers in the clearance space which layers are moved peripherally by the blades 148 without excessive abrasive action by the sand particles.

Preferably, the set screws 162 that hold the bearings 161 in place are adjusted to position the axis of the rotary filter means slightly above the axis of the housing 55 so that the clearance space 180 (Fig. 9) between the rotating cylindrical wall 142 and the stationary cylindrical wall 56 of the housing 55 progressively increases with increasing distance from the transverse opening 45 in the platform 12. Thus, any tendency of the sand particles to abrade the surfaces of the clearance space progressively decreases as the sand is moved by the blades 148. By virtue of this eccentricity of the rotary filter means relative to the surrounding housing 55, the pressure of the blades 148 against the cylindrical wall 56 of the housing also progressively decreases as the blades move away from the transverse opening 45 in the platform 12. The flexibility of the edge portions 159 of the blades is sufficient, however, to maintain sealing contact with the cylindrical wall 56 for an adequate distance from the transverse opening 45.

In a further modification of the invention illustrated in Figs. 12 and 13, a rotary filter means 190, 191 is shown in the vacuum chamber 48 spanning the transverse opening 45 in the platform 12 over which the layer of pulp travels. The rotary filter means 190, 191 is mounted in a filter housing generally designated 186 having a cylindrical wall 187. This housing is of the same general character as heretofore described. The rotary filter means has an open core structure mounted for rotation on a hollow shaft 188 that has water discharge openings 189. The rotary filter means has a slot-perforated cylindrical wall 190 with flexible longitudinal blades 191 extending radially therefrom for contact with the cylindrical wall 187 of the housing 186. In this particular construction, the blades 191 moving along the cylindrical wall 187 of the housing form a series of traveling pockets 194 that are relatively deep in comparison with the construction heretofore described. The present construction also differs in that the blades 191 have numerous perforations in the form of conical openings 195 with the larger ends of the openings facing the direction of rotation of the filter means. Preferably a suitable spray head 196 is positioned in the vacuum chamber 48, as shown, for the purpose of directing a spray of water into the pockets 194 as the blades move clear of the cylindrical wall 187 of the housing.

In the operation of this last described rotary filter means 190, 191, water from the pulp traveling across the platform 12 is free to flow not only through the open core structure but also around the periphery of the core structure from pocket to pocket through the perforations 195 in the blades 191. Some of the pulp enters the interior of the rotary filter means from which it is discharged by water released from the hollow shaft 188. The bodies of sand in the pockets 194 are released by gravity as the pockets successively turn downward away from the cylindrical wall 187 of the housing and the flaring configuration of the conical perforations 195 tends to cause any sand therein to drop away as each wall in succession reaches a substantially horizontal position. Any particles of pulp remaining in a downwardly turned pocket are removed by the action of the spray head 196. The quantity of water supplied by the hollow shaft 188 together with the additional quantity supplied by the spray head 196 is adequate to flush the discharged sand out of the vacuum chamber 48 in the manner here described, the discharged sand being either discarded as waste or recycled through the apparatus. The quantity of sand diverted in this manner may be minimized by operating this rotary filter means at a relatively slow speed.

The various specific embodiments of the invention described in detail herein will suggest to those skilled in the art various changes, substitutions and other departures from my disclosure that properly lie within the spirit and scope of the appended claims.

I claim as my invention:

1. In an apparatus for processing pulp, the combination of: wall means for contact with said pulp, said wall means having an opening for the flow of fluid from the pulp therethrough; supports for said wall means; means providing for moving pulp across said opening; a rotary brush disposed below said wall means and having a peripheral portion spanning said opening to contact pulp moving across the opening, said wall means including means at the discharge side of said opening to receive processed pulp from said rotary brush; means extending to the interior of the rotary brush to direct fluid outward between the bristles of the rotating brush that have passed said opening to remove particles from the bristles, the interior of said rotary brush being of open construction to receive said extending means and fluid; and arcuate walls partially extending around the sides of the periphery of the brush to form a passage that contains the brush, thereby directing fluid flow from the pulp through the brush, said rotary brush carrying a plurality of circumferentially spaced longitudinally blades for contact with said arcuate walls to cut off fluid flow around the periphery of the brush, thereby directing fluid flow through the interior of the brush.

2. A combination as set forth in claim 1 in which the bristles of the rotary brush are of lesser radial extent than said blades with a peripheral clearance between the bristles and said arcuate walls.

3. In an apparatus of the class described for processing pulp the combination of: wall means for contact with said pulp, said wall means having an opening for the flow of fluid from the pulp therethrough; means supporting said wall means; means for moving pulp along said wall means and across said opening; rotary brush means disposed at one side of said wall means and having a peripheral portion spanning and filling said opening to contact pulp moving across the opening; arcuate walls extending at least partially around the sides of the periphery of the rotary brush means to form passageways that include the brush means and direct fluid flow from the pulp through the brush means; and a plurality of circumferentially spaced longitudinal blades carried by said brush means for contact with said arcuate walls to cut off fluid flow around the periphery of the brush means and direct fluid flow through the interior of the brush means.

4. A combination as in claim 3 in which the bristles of said rotary brush means are of less radial extent than that of said blades, there being a peripheral clearance between said bristles and said arcuate walls.

5. A combination as in claim 4 including means to produce a fluid pressure differential across the brush means whereby to create fluid flow from the pulp through the brush means to remove particles from the bristles of the brush means which have passed said opening and are directed away from said opening.

6. A combination as in claim 3 including means to produce a fluid pressure differential across the brush means whereby to create fluid flow from the pulp through the brush means to remove particles from the bristles of the brush means which have passed said opening and are directed away from said opening.

7. In an apparatus of the character described for processing pulp, the combination of: wall means for contact with said pulp, said wall means having an opening for the flow of fluid from the pulp therethrough; supports for said wall means; means for moving pulp across said opening; a rotary bristle brush disposed below said wall means and having a peripheral portion spanning said opening to contact pulp moving across the opening, said wall means including means adjacent said rotary brush for receiving from the brush, processed pulp which has crossed said opening; arcuate walls at least partially extending around the sides of the periphery of the brush to form a passage including the brush thereby directing fluid flow from the pulp through the brush, said brush carrying a plurality of circumferentially spaced longitudinal blades for contact with said arcuate walls to cut off fluid flow around the periphery of the brush, thereby directing fluid flow through the interior of the brush; and means extending into the interior of the rotary brush to direct fluid flow outward between the bristles of the rotating brush that have passed said opening to remove particles from the bristles.

8. A combination as in claim 7 in which the bristles of the rotary brush are of lesser radial extent than said blades, with a peripheral clearance between the bristles and said arcuate walls.

9. In an apparatus of the character described for processing pulp, the combination of: wall means for contact with said pulp, said wall means having an opening for the flow of fluid from the pulp therethrough; a perforate rotary filter means located at one side of said wall means and opening and having a peripheral portion spanning and moving across said opening to contact pulp moving across the opening; means for moving said pulp across said wall means and opening; and means including a passage means disposed coaxially in the rotary filter means to direct a fluid outward through the rotary filter means in a direction away from said pulp to remove particles from said peripheral portion, said wall means having a portion lying beyond the discharge side of said opening for removing processed pulp from said rotary filter means.

10. In an apparatus of the character described for processing pulp, the combination of: wall means for contact with said pulp, said wall means having an opening for the flow of fluid from the pulp therethrough; support means for said wall means; a perforate rotary filter means below said opening and said wall means and having a peripheral portion spanning said opening to contact pulp across the opening; means including a perforated cylindrical fluid passage means extending along the axis of the rotary filter means for the introduction of a fluid into the interior of the filter means; and a larger perforated cylinder loosely hanging on said fluid passage means, the perforations of the loose cylinder being offset relative to the perforations of the fluid passage means to prevent registry therewith whereby the loose cylinder blocks radial outward flow from the fluid passage means upward.

11. In an apparatus of the character described for processing pulp, the combination of: wall means for contact with said pulp, said wall means having an opening for the flow of fluid from the pulp therethrough; support means for said wall means; a perforate rotary filter means disposed below said wall means and opening and having a peripheral portion spanning said opening to contact a pulp disposed across the opening; means including a perforated cylindrical fluid passage means extending along the axis of the rotary filter means to rotate therewith for the introduction of a fluid into the interior of the filter means; and a larger perforated cylinder loosely hanging on said fluid passage means, the perforations of the loose cylinder being offset relative to the perforations of the fluid passage means to prevent registry therewith whereby the loose cylinder blocks radial outward flow from the fluid passage means during a portion of the rotation of the filter means and releases flow to dislodge particles from the filter means during another portion of the rotation.

12. In an apparatus of the character described for processing pulp, the combination of: support means; wall means carried by said support means for contact with said pulp, said wall means having an opening for the flow of fluid from the pulp therethrough; a rotary brush below said wall means and having a peripheral portion spanning said opening to contact pulp disposed across the opening; arcuate walls extending from said opening and partially encasing the periphery of the brush, said walls being radially spaced from the bristles of the brush; and a plurality of circumferentially spaced longitudinal blades carried by the brush and extending from the brush into contact with said walls.

13. A combination as set forth in claim 12 which includes means extending into the interior of the rotary brush to direct a fluid outward through the brush in a direction away from said pulp to remove particles from the bristles of the brush and said blades.

14. A rotary brush of the character described for use as a filter element with fluid flowing through the brush, said brush having: an axial member; a plurality of axially spaced support members carried by said axial member and extending radially outward therefrom to form therewith an open core structure; a plurality of longitudinal brush members removably mounted on said support members, each of said brush members having a relatively narrow rigid longitudinal base with bristles diverging outward therefrom, said bases being spaced circumferentially to form an open peripheral structure surrounding said open core structure for free fluid flow radially into and out of the open core structure, the bristles of said brush members meeting to form a substantially continuous periphery of bristles for blocking the flow of solid particles into the open core structure of the brush; and a plurality of circumferentially spaced longitudinal blades disposed among the bristles of the brush to block circumferential fluid flow around the brush through the brush bristles.

15. A brush as set forth in claim 14 in which said blades are supported by bases of said brush members.

16. In an apparatus of the character described for processing pulp, the combination of: support means; wall means carried by said support means for contact with said pulp, said wall means having an opening for the flow of fluid therethrough from the pulp; a rotary filter means having the general configuration of a hollow cylinder and having numerous peripheral passages for fluid flow therethrough, said passages being restricted in dimension to minimize the movement of pulp therethrough, said filter means being positioned below said wall means with a peripheral portion spanning said opening for contact with said pulp; means extending into the interior of said rotary filter means to wash pulp away from portions of the filter means that are rotated away from said pulp; stationary arcuate walls substantially concentric with and extending partially around the periphery of said rotary means; and a plurality of circumferentially spaced longitudinal blades on said rotary filter means for cooperation with said stationary arcuate walls to cut off fluid flow around the periphery of the rotary means.

17. A combination as in claim 16 including means to create a pressure differential across the rotary filter means to produce fluid movement through the rotating filter means.

18. A combination as set forth in claim 16 in which said blades are dimensioned for contact with said arcuate walls and said rotary means is dimensioned to provide a clearance space between its periphery and the arcuate walls to permit a layer of the pulp to travel around said arcuate walls.

19. A combination as set forth in claim 18 in which the radial dimension of said clearance space is on the order of three times the particle size of said pulp.

20. A combination as set forth in claim 16 in which said arcuate walls extend in both circumferential directions from said opening to define a passage with said opening constituting the entrance to the passage and in which said arcuate walls are eccentric relative to the axis of rotation of said rotary means, the arcuate walls being nearer to said axis adjacent said opening than at points spaced away from the opening.

21. A combination as set forth in claim 16 in which said blades are perforated.

References Cited in the file of this patent

UNITED STATES PATENTS

| | | |
|---|---|---|
| 327,708 | Moffitt | Oct. 6, 1885 |
| 399,984 | Gessl | Mar. 19, 1889 |
| 1,887,129 | Hirsch | Nov. 8, 1932 |
| 2,139,445 | Dinwiddie | Dec. 6, 1938 |
| 2,237,635 | Saxe | Apr. 8, 1941 |
| 2,351,712 | Sattele et al. | June 20, 1944 |
| 2,499,412 | Peterson | Mar. 7, 1950 |
| 2,581,210 | Simpson | Jan. 1, 1952 |

FOREIGN PATENTS

| | | |
|---|---|---|
| 36,133 | Australia | Feb. 10, 1909 |